United States Patent [19]
Ellenberger et al.

[11] Patent Number: 6,129,809
[45] Date of Patent: Oct. 10, 2000

[54] HEAT-SEALING MACHINE

[75] Inventors: Bernd Ellenberger, Gonbach; Klaus Kutscher, Kaiserslautern; Karl Herzer, Kaiserslautern; Manfred Neurohr, Kaiserslautern, all of Germany

[73] Assignee: G.M. Pfaff Aktiengesellschaft, Germany

[21] Appl. No.: 09/212,820

[22] Filed: Dec. 16, 1998

[30] Foreign Application Priority Data

Dec. 19, 1997 [DE] Germany .............................. 197 56 767
Nov. 25, 1998 [DE] Germany .............................. 198 54 259

[51] Int. Cl.[7] .................................................. B29C 65/10
[52] U.S. Cl. ............................ 156/351; 156/82; 156/352; 156/358; 156/359; 156/360; 156/361; 156/497; 156/499; 156/555
[58] Field of Search ............................... 156/64, 82, 351, 156/352, 358, 359, 360, 361, 497, 499, 555, 582

[56] References Cited

U.S. PATENT DOCUMENTS

| 4,447,288 | 5/1984 | Seaman | 156/574 |
| 4,608,114 | 8/1986 | Nakao | 156/497 |
| 4,747,903 | 5/1988 | Miller | 156/366 |
| 4,769,102 | 9/1988 | Neumuller et al. | 156/359 |
| 4,950,352 | 8/1990 | Greller | 156/497 |
| 5,466,326 | 11/1995 | Cherney | 156/359 |
| 5,804,029 | 9/1998 | Achelpohl et al. | 156/497 |
| 6,032,714 | 3/2000 | Fenton | 156/497 |
| 6,053,230 | 4/2000 | Pelland | 156/359 |

*Primary Examiner*—James Sells
*Attorney, Agent, or Firm*—McGlew and Tuttle, P.C.

[57] ABSTRACT

The most important heat-sealing parameters must be able to be adapted to different conditions of use in a simple and accurate manner. This is accomplished by the hot air temperature, on the one hand, and the amount of hot air, the speed of rotation of the pressing rollers (8, 9) and/or the pressing pressure of the pressing rollers (8, 9), on the other hand, being able to be controlled via controllers (41, 37, 24, 29), wherein a basic setting of the set points of these controlled variables is performed as a function of material- and/or application-specific characteristics, and by the position of the hot air nozzle (16) in terms of height (H), distance (A) and/or of the oncoming flow angle (α) with respect to the roller gap being able to be set by motor operators (18, 19, 21) as a function of the intended use and/or the thickness of the workpiece.

9 Claims, 2 Drawing Sheets

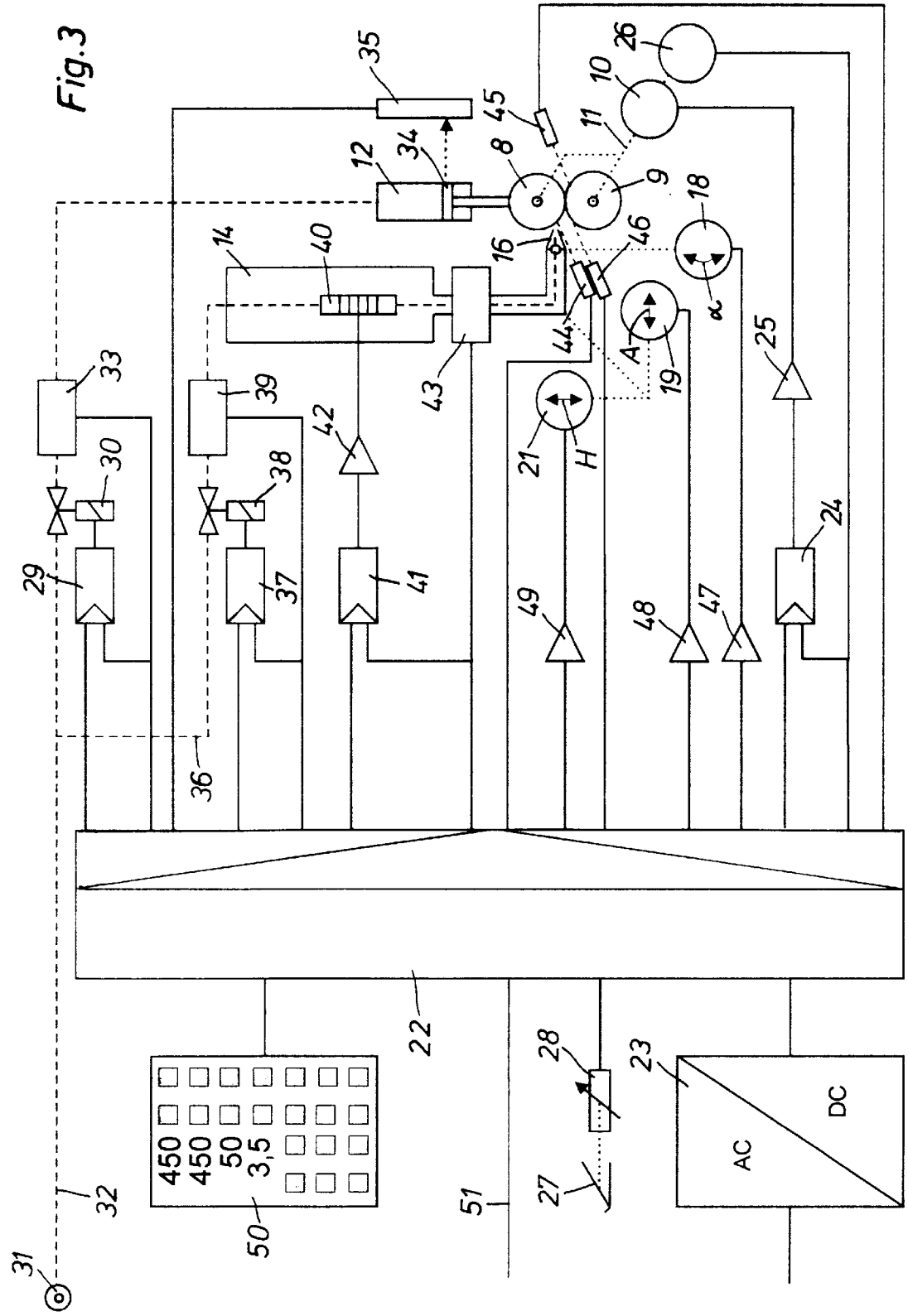

HEAT-SEALING MACHINE

FIELD OF THE INVENTION

The present invention pertains to a heat-sealing machine for connecting a tape coated with a thermoplastic adhesive to a workpiece with a hot air nozzle, a pair of driven pressing rollers and a control and regulating device for adjusting the temperature of the hot air and for operating the nozzle as well as the pressing rollers.

BACKGROUND OF THE INVENTION

U.S. Pat. No. 5,466,326 discloses a heat-sealing machine, in which the hot air temperature is adjusted during a change in the velocity of feed of the material being welded such that to achieve uniform quality of welding, the hot air temperature is correspondingly increased when the velocity of feed increases and it is correspondingly reduced when the velocity of feed decreases. The adjustment of the hot air temperature is achieved either by interfering with the energy supply to the air heater or, at constant energy supply, by adjusting a deflecting plate, which makes possible a variable mixing of hot and cold air. This machine was designed for carrying out a very specific work process, in which the same materials are obviously processed at all times, since there is, e.g., no reference to a variable pressing device or a pressing device adjustable to different values.

SUMMARY AND OBJECTS OF THE INVENTION

The primary object of the present invention is to provide a heat-sealing machine that can be adapted to different conditions of use with respect to the most important parameters of heat sealing in a simple and accurate manner.

According to the invention, a heat-sealing machine for connecting a tape coated with a thermoplastic adhesive to a workpiece is provided with a hot air nozzle, a pair of driven pressing rollers and a control and regulating device for adjusting the temperature of the hot air and for operating the nozzle as well as the pressing rollers. The heat-sealing machine can be controlled by a controller of the control and regulating device, wherein the hot air temperature before the outlet of the nozzle can be determined as the actual value in the standby operation of the machine with the nozzle in the resting position and the surface temperature of at least one point of the tape located before or behind the heat-sealing point can be determined as the actual value during a heat-sealing process. A basic setting of the two set points to be associated alternatively is performed as a function of material and/or application-specific characteristics. The amount of hot air, the speed of rotation of the pressing rollers and/or the pressing pressure of the pressing rollers can be controlled via controllers, wherein a basic setting of the set points of these controlled variables is performed as a function of material- and/or application-technical characteristics. The position of the nozzle in terms of the height, the distance and/or the oncoming flow angle ($\alpha$) can be set as a function of the intended use and/or the thickness of the workpiece by means of said motor operators.

Due to the measure of controlling the hot air temperature, on the one hand, and the amount of hot air, the speed of rotation of the pressing rollers and/or the pressing pressure, on the other hand, as a function of material- and/or application-specific characteristics, the most important parameters, which influence the quality of sealing during heat sealing, can be accurately adjusted to the particular material being processed, and, e.g., parameters stored in a memory individually or in certain combinations may be able to be polled by pressing a button.

It is particularly advantageous in the hot air temperature control according to the present invention to adjust this control to the actual operating state of the machine by maintaining the hot air at a constant value during standby operation with the nozzle in the resting position by means of a sensor measuring the hot air temperature before it leaves the nozzle, while the surface temperature of at least one point of the tape located before or behind the heat-sealing point is adjusted to the value necessary for the satisfactory connection while the heat-sealing process is being carried out and this temperature value is determined either by empirical experiments or is taken from corresponding data sheets. Since the effect of interference variables caused by environmental effects, e.g., varying room temperature, are also detected indirectly in the process, such interference variables are also eliminated without additional measuring effort and signal processing.

Furthermore, the possibility of adjusting the hot air nozzle by means of a motor makes it possible to set the position of the said nozzle in relation to the heat-sealing point as a function of the intended use and/or the thickness of the workpiece. Such a basic setting of the nozzle, taking into account the overall thickness of the workpiece, can be carried out before the beginning of the heat-sealing process by polling setting values stored in a memory or by directly interfering with the control of the motor operators.

According to a further feature of the invention, the temperature of the molten adhesive is measured as the actual value to be determined for controlling the hot air temperature during a heat-sealing process, as a result of which it is guaranteed that the temperature of the adhesive will be within the range required for a satisfactory heat-sealing connection to the workpiece likewise entering the roller gap at the time of the entry of the tape into the roller gap even in the case of varying environmental conditions.

Due to the measure proposed with further features of the invention, according to which the temperature of the tape, which is now connected to the workpiece, is measured behind the roller gap and this measured value is compared with an empirically determined set point, which would be obtained in the case of the heat-sealing process taking place properly, and the measured value obtained is introduced into the control process as the actual value of an auxiliary controlled variable, an additional contribution is made to ensuring that the heat-sealing process will always take place in the necessary temperature range.

Due to the measure according to further features of the invention, the speed of rotation of the pressing rollers and consequently the velocity of feed of the workpiece and of the tape can be reduced, e.g., while working in narrow arches or curves in order to guide the workpiece more accurately. This is performed, e.g., by means of a pedal coupled with a potentiometer, as a result of which the set point sent to the speed governor can be adapted to the actual needs of handling in a process-dependent manner. When the velocity of feed is reduced during the heat-sealing of curves or arches, the resulting tendency of the temperature of the adhesive to rise is counteracted by the control of the hot air temperature by the temperature of the hot air being reduced to a corresponding extent, so that the amount of energy introduced per unit of time is maintained at a constant value.

By measuring the current thickness of the workpiece, which may be much greater than the thickness of the one-layer workpiece laid out flat, during the coverage of cross seams with folded-over edge areas, the position of the nozzle can be adapted according to further features of the invention to the particular conditions determined by the workpiece during heat-sealing.

The interfering effects addressed by further features of the invention are, e.g., the special conditions at the beginning of a heat-sealing process that influence the quality of sealing. Since the workpiece and the entering tape are not yet preheated at that time, the amount of energy introduced is somewhat increased, e.g., by lowering the nozzle, during the first section of the heat-sealing, which amounts to about 3 cm.

Additional advantageous embodiments are described wherein the measures according to further features of the invention are intended to avoid overheating of the workpiece. This is necessary especially when a workpiece contains a vapor-permeable membrane, which is usually highly sensitive to heat.

The present invention will be explained on the basis of an exemplary embodiment shown in the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 3 is a block diagram of the control and regulating device of the heat-sealing machine.

DESCRIPTION OF THE PREFERRED EMBODIMENT

Figure 1:
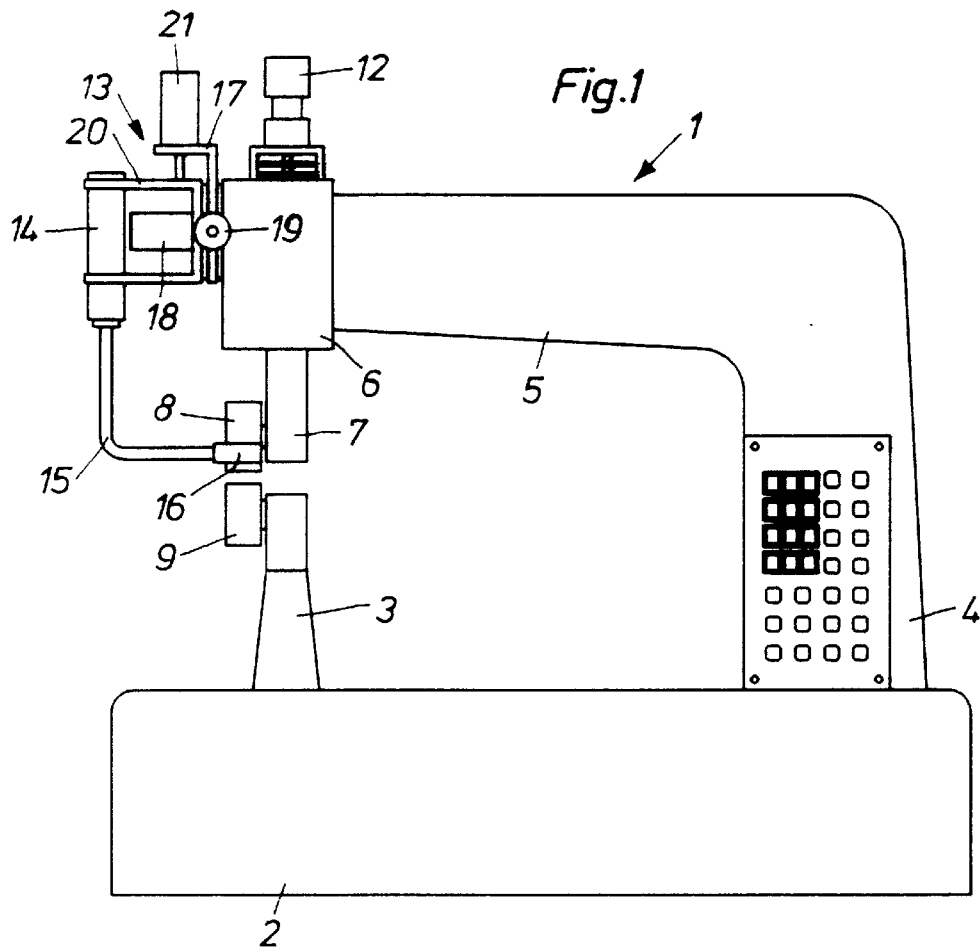
FIG. 1 is a front view of a heat-sealing machine shown in a simplified form.
Figure 2:
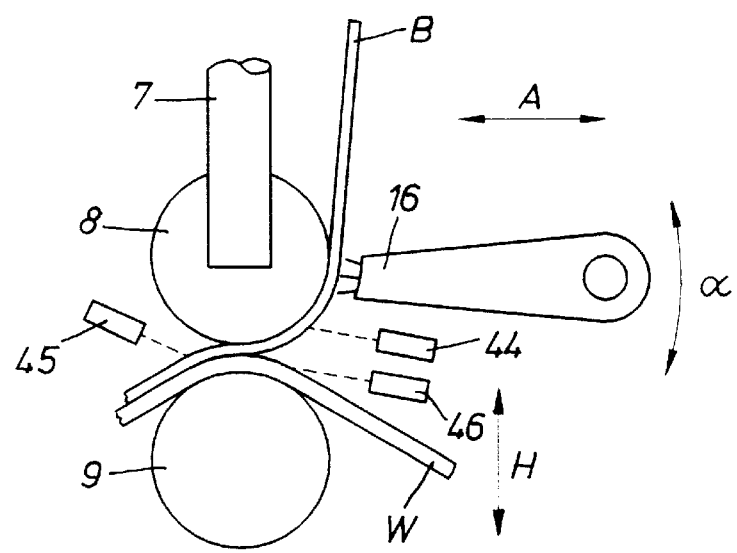
FIG. 2 is a side view of the pressing rollers and the nozzle.

Referring to the drawings in particular, a housing 1 of the machine comprises a base 2, a column 3, a frame 4 and an arm 5, which passes over into a head 6. An axially movable support 7, at the lower end of which a pressing roller 8 is mounted, is arranged in the head 6. The pressing roller 8 cooperates with a pressing roller 9 arranged on the column 3. The pressing rollers 8, 9 are driven by a common motor 10 shown schematically in FIG. 3 and a transmission 11 indicated by broken line. A compressed air cylinder 12, by means of which the pressing pressure of the upper pressure roller 8 against the lower pressure roller 9 can be generated, is used to raise and lower the support 7.

A bracket 13 for an air heater 14, which is connected to a hot air nozzle 16 via a pipe 15, is arranged at the head 6. The bracket 13 has an L-shaped support plate 17, which can be pivoted around a horizontal axis and whose angular position can be set by a stepping motor 18. The support plate 17 is accommodated in horizontal guides, not shown, which extend in parallel to the direction of feed, and is displaceable horizontally by a stepping motor 19. A U-shaped frame 20 carrying the air heater 14 is accommodated in vertically extending guides of the support plate 17, not shown, and is vertically displaceable by means of a stepping motor 21.

The oncoming flow angle a of the nozzle 16 can thus be set by means of the stepping motor 18, the horizontal distance A between the nozzle 16 and the upper pressing roller 8 can be set by means of the stepping motor 19, and the height H of the nozzle 16 can be set by means of the stepping motor 21.

The control or regulating device shown in FIG. 3 contains a computer 22, which is operated via a power supply unit 23. The motor 10 for driving the pressing rollers 8, 9 is operated from the computer 22 via a controller 24 and a power stage 25. A tachometer generator 26, which is connected to the computer 22 and the controller 24, is used to determine the actual value of the motor speed. The set point of the motor speed is generated by a pedal 27 and a potentiometer 28 that can be adjusted by same.

The compressed air cylinder 12 is operated via a controller 29, with which a servo valve 30 is associated as a final control element. The servo valve 30 influences the pressure of the compressed air being supplied from a compressed air source 31 via a line 32. A pressure sensor 33, whose signal is sent to the computer 22 and the controller 29, is used to determine the actual pressure value. The current distance between the upper pressing roller 8 and the lower pressing roller 9 is determined by means of a sensor 35 scanning the position of the cylinder piston 34 during welding and is sent to the computer 22. The actual overall thickness of the material present between the pressing rollers 8, 9, which consists of, e.g., a workpiece W prepared by sewing and a cover tape B to be bonded to the thread seams, is determined indirectly by measuring the distance between the pressing rollers 8, 9.

The air heater 14 is connected to the compressed air source 31 via the line 32 and a branch line 36. A controller 37, with which a servo valve 38 is associated as a final control element, is used to control the amount of air. A sensor 39, whose signal is sent to the computer 22 and the controller 37, is used to determine the actual value of the amount of air being fed to the air heater 14.

The air heater 14 has an electrically operated heating element 40, which is operated via a controller 41 connected to the computer 22 and a power stage 42. A sensor 43, which is arranged in the pipe 15 and is connected to the computer 22 and the controller 41, is used to determine the actual value of the hot air temperature. An infrared sensor 44, which measures the surface temperature of the adhesive layer of the cover tape B at a point located between the point of contact of the hot air flow and the intake gap between the pressing rollers 8, 9, is fastened to a bracket, not shown. A second infrared sensor 45, which is arranged behind the pressing rollers 8, 9 at the said bracket, measures the surface temperature of the tape B already bonded to the workpiece W. Both sensors 44, 45 are connected to the computer 22 and the controller 41.

Another infrared sensor 46, which measures the surface temperature of the workpiece W shortly before it reaches the roller gap, is fastened to the above-mentioned bracket. This sensor 46 is likewise connected to the computer 22.

The infrared sensors 44, 45, 46 are of the prior-art design and therefore they will not be explained in greater detail and they consequently include a receiver for the heat radiation emitted by the tape B and the workpiece W.

The stepping motors 18, 19, 21 used to adjust the oncoming flow angle $\alpha$, the distance A and the height H are controlled from the computer 22 via power stages 47, 48 and 49.

The computer 22 is also connected to a control panel 50, which also contains a display, besides control buttons. Finally, the computer 22 also has a data interface 51, represented as a line, by which it can be connected to a modem or additional heat-sealing machines.

Mode of operation

Before the beginning of a heat-sealing process, a basic setting of the heat-sealing machine is performed as a function of the material to be processed and its overall thickness, i.e., the thickness of the workpiece W and of the cover tape B to be bonded thereto, by polling the appropriate setting values as set points for the controllers 41, 37, 24 and 29 from a memory of the control and regulating device. A certain hot air temperature, a certain amount of hot air and a certain pressing pressure are correspondingly set. Furthermore, the nozzle 16 is moved into a position adapted to the operation and the overall thickness of the material by means of the stepping motors 18, 19, 21. Finally, a basic setting of the speed of rotation of the pressing rollers 8, 9 is also performed by adapting the maximum speed of rotation that can be reached upon the maximum pivoting of the pedal 27 to the material to be processed.

Immediately after switching on the machine and in the standby operation between the heat-sealing operations, the nozzle 16 is in its resting position, in which the hot air flow is kept away from the tape B and the workpiece W. The temperature of the hot air flow being measured by the sensor 43 is used during this time as the actual value for controlling the hot air temperature and is adjusted to a set point of, e.g., 400° C.

To carry out a heat-sealing operation, the nozzle 16 is pivoted into its working position, after which the hot air flow, which is now directed directly onto the thermoplastic adhesive layer of the tape B, brings the adhesive into a temperature range of about 150–170° C. for melting. The temperature of the melted adhesive measured by the sensor 44 is now used during heat sealing as an actual value for controlling the hot air temperature and is maintained within the above-mentioned temperature range, even if the ambient conditions change. The surface temperature of the tape B, which is bonded to the workpiece W and runs out between the pressing rollers 8, 9, is measured by means of the sensor 45 and is compared with an empirically determined set point range as it would be obtained in the case of a heat-sealing operation taking place properly and equals, e.g., 80° C. to 90° C. The measured value of the sensor 45 is now introduced as an actual value of an auxiliary controlled variable into the hot air control process. Additional interfering effects, which may be caused, e.g., by the pressing rollers 8, 9 being still cool or by the pressing rollers 8, 9 having become too hot due to prolonged operation, can thus be eliminated.

At the beginning of a heat-sealing or bonding operation, the operation is carried out with the nozzle 16 slightly lowered during the first three cm. The nozzle 16 is then raised by the motor 21 to the preselected normal height H.

When bonding the tape B in curves or arches, the speed of rotation of the pressing rollers 8, 9 and consequently the velocity of feed are reduced by means of the pedal 27, so that the operator can handle the workpiece W more easily. The set point of the speed governor (24) is adjusted to the change in the pedal position by a time function element or a ramp control, as a result of which abrupt changes in the speed of rotation are avoided. Since the temperature increase in the adhesive caused by the low velocity of feed will thus act more slowly in the adhesive than in the case of an abrupt change in the speed of rotation, the controller 41 can adapt the hot air temperature more uniformly to the changed conditions.

As soon as a thickened part in the workpiece W enters between the pressing rollers 8, 9 and the pressing roller 8 is raised as a result, the change in distance caused by the thickened part will be detected by the sensor 35 and communicated to the computer 22. The consequence of this is that in the case of unchanged position of the pedal 27, the set point for the controller 24 and thus the velocity of feed decrease, and the nozzle 16 is raised by a few mm. The consequence of this is that the pressing time of the pressing rollers 8, 9 is prolonged and increased amount of energy is introduced into the tape B, so that the tape B will be bonded satisfactorily even in thickened areas of the workpiece W and it guarantees reliable sealing in that area in the case of weatherproof clothing.

The heat-sealing machine according to the present invention is particularly suitable for processing workpieces W with an integrated vapor-permeable membrane. Since this membrane is sensitive to heat, it must be ensured that the workpiece W, which is necessarily also heated by the hot air flow for a proper heat sealing, will not become too hot. This monitoring is assumed by the sensor 46. If the surface temperature of the workpiece W exceeds a maximum of 80° C., a warning signal is generated, so that the operator can change the position of the nozzle 16 to the extent that the hot air flow will act on the workpiece W to a smaller extent.

Instead of the sensor 35 scanning the position of the cylinder piston 34, another, mechanically or optically operating sensor may be used as well. Such a sensor could be arranged such that its scanning point is located in front of the pressing rollers 8, 9, so that it can react to thickened areas of the workpiece in time.

While a specific embodiment of the invention has been shown and described in detail to illustrate the application of the principles of the invention, it will be understood that the invention may be embodied otherwise without departing from such principles.

What is claimed is:

1. A heat-sealing machine for connecting a tape coated with a thermoplastic adhesive to a workpiece, comprising:

a hot air nozzle;

a pair of driven pressing rollers;

a control and regulating device for adjusting the temperature of the hot air and for operating the nozzle as well as the pressing rollers, said control and regulating device including a set point controller responsive to the hot air temperature before the outlet of said nozzle, determined as an actual value in the standby operation of the machine with said nozzle in the resting position and responsive to said surface temperature of at least one point of the tape located before or behind a heat-sealing point can be determined as the actual value during a heat-sealing process, the set point controller performing a basic setting of the two set points to be associated alternatively, as a function of material and/or application-specific characteristics, a further controller for setting the amount of hot air, the speed of rotation of the said pressing rollers and/or the pressing pressure of said pressing rollers, wherein a basic setting of the set points of these controlled variables is performed as a function of material and/or application-technical characteristics, and motor operators for setting the position of said nozzle in terms of the height, the distance and/or the oncoming flow angle as a function of the intended use and/or the thickness of the said workpiece.

2. The heat-sealing machine in accordance with claim 1, wherein the temperature of the adhesive between the point of contact of the hot air flow and the gap between said pressing rollers can be measured by said sensor as the actual value to be determined for the control of the hot air temperature during the heat-sealing process.

3. The heat-sealing machine in accordance with claim 2, wherein a temperature of a reverse side of the tape can be measured by a sensor behind the heat-sealing point and it can be sent as an actual value of an auxiliary controlled variable to said controller for the hot air temperature.

4. The heat-sealing machine in accordance with claim 1, wherein said further controller provides a set point for a speed governor which can be controlled by a setting member in a process-dependent manner during the heat-sealing process wherein said setting member is connected to said speed governor via one of a time function element or a ramp control.

5. The heat-sealing machine in accordance with claim 1, wherein the thickness of the workpiece entering the area of said pressing rollers can be measured by a thickness sensor and a corresponding adjustment of the position of said nozzle can be performed by said motor operators as a function of the current measured value of said thickness sensor.

6. The heat-sealing machine in accordance with claim 1, wherein to compensate interfering effects occurring in a time or path-dependent manner in the amount of energy introduced into the tape or the workpiece, said nozzle position can be changed in relation to its normal setting in a time or path-controlled manner.

7. The heat-sealing machine in accordance with claim 1, wherein the temperature of the workpiece can be measured by a temperature sensor before the gap between said pressing rollers and this temperature value can be compared with a material-specific upper limit value, wherein a warning and/or switch-off signal can be generated by the control and regulating device when this limit value is exceeded.

8. The heat-sealing machine in accordance with claim 1, wherein for heat-sealing machines of the same type, the devices important for the variables of the sealing parameters, namely, the hot air temperature, the amount of hot air, the pressing pressure of the rollers, the speed of rotation of the rollers and the nozzle position, can be adjusted by said control and regulating device to a respective primary standard.

9. The beat-sealing machine in accordance with claim 8, wherein said control and regulating device has a computer and said computer can be connected to other heat-sealing machines or to a modem via a data interface.

* * * * *